Sept. 25, 1928.  
D. SANDFORD  
1,685,615
WARPLESS VALVE PLATE
Filed May 26, 1923
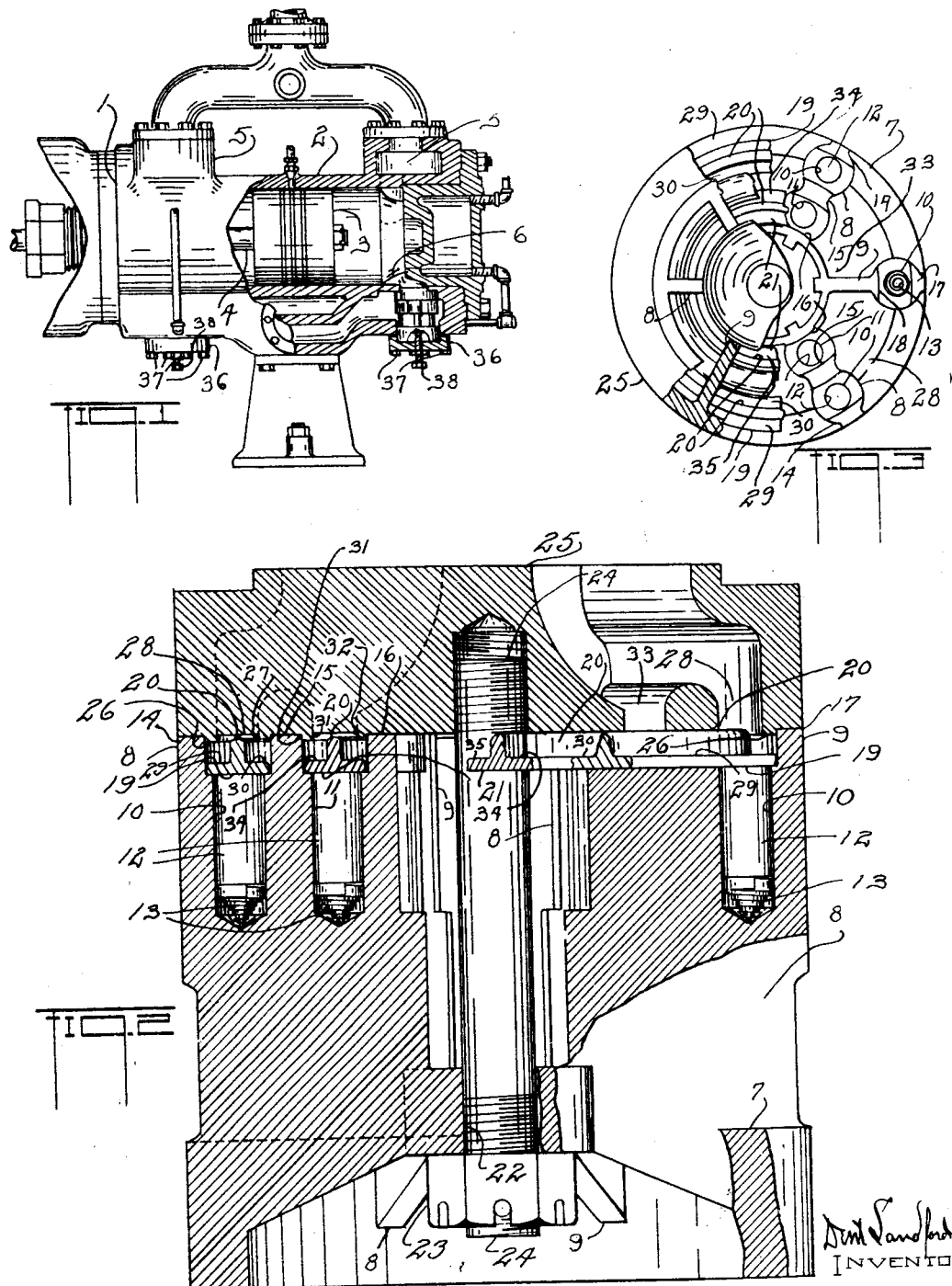

Patented Sept. 25, 1928.

1,685,615

UNITED STATES PATENT OFFICE.

DENT SANDFORD, OF TOLEDO, OHIO.

WARPLESS VALVE PLATE.

Application filed May 26, 1923. Serial No. 641,561.

This invention relates to valves.

This invention has utility when incorporated in one-way valves of the pressure seated type, especially in ring form for use in compressors, as a warpless valve in refrigeration apparatus outlets.

Referring to the drawings:

Fig. 1 is a fragmentary view of a refrigeration apparatus compressor, having an embodiment of the invention therein as a warpless outlet valve;

Fig. 2 is an enlarged view of the valve of Fig. 1, parts being broken away; and

Fig. 3 is a plan view of the valve of Fig. 2, parts being broken away.

Compressor 1 is shown as having cylinder 2, provided with piston 3 therein reciprocable by piston rod 4. Inlet valves 5 at each end of the cylinder 2 permit supply of the gas, as ammonia, to be compressed in the cylinder 2 and pass therefrom by outlet ports 6 in this double acting pump type of compressor.

In each outlet port 6 is assembled a valve body of the invention herein. Such valve includes main body portion 7 of general cylindrical form having at one end three radiating ribs 8 alternating with three other radiating ribs 9. An outer annular series of six openings or pockets 10 is provided in the ribs 8, 9, while in the ribs 8, there is a second annular series of three openings or pockets 11. These pockets 10, 11, are parallel to the axis of the body 7. In each pocket 10, 11, is a plunger or pin 12, normally urged therefrom by a compression helical spring 13. The ribs 8, have lugs 14, 15, 16, with the opposing sides acting as guide faces. The ribs 9 have lugs 17, 18, with the opposing sides acting as guide faces.

Between the guide faces 14, 15, and 17, 18, as a single annular series, there is disposed a valve plate 19 of T-form in cross section. This ring plate 19 has on its side remote from the pins 12, a flange, rib or continuous central fin or leg 20 as a warp-resisting stiffener.

Between the guide faces 15, 16, is disposed a second ring form valve plate 21, also having an endless stiffening stem or rib 20, to preserve its lightness for quick action with low inertia, while rendering it warpless due to the heat action of the compressed outcoming fluid. This second smaller valve plate 21 is concentric with the ring 19.

Against end of opening 22 central of the member 7 and remote from the ribs 8, 9, may engage nut 23 coacting with stud bolt 24, extending through the member 7 to engage cap 25 having endless annular seats 26, 27, upon opposite sides of valve port opening 28, so that seats 29, 30, of the plate 19 as thrust into closing position with the seats 26, 27, may normally effect closure of the opening 28 against back pressure from the receiver, to which the compressor is delivering coming to the compressor. In practice the springs 13 hold the plate 19 poised when the compressor is delivering fluid through the port 6 on the compression stroke of the piston 3. At once the flow from the cylinder 2 is discontinued, the springs 13 urge the plate 19 toward the opening 28, and as supplemented by the pressure in the receiver the opening 28 is closed against flow back into the cylinder 2, so that a new charge may be received by way of the intake valve 5 at such end of the cylinder 2.

This valve cap member 25 concentrically of and inward from the seats 26, 27, has seats 31, 32, spaced by opening 33, normally closed by valve plate 21 having its seats 34, 35, against the seats 31, 32. The ribs 8', 9', may register with the ribs 8, 9, and span the openings 28, 29, in the extent of these ribs radially. These valve rings or plates 19, 21, act simultaneously and similarly. In the travels of these valve plates 19, 21 toward and from seating position, the ends of the cross portion of the T, that is, the edges of the plates proper, coact with the guide faces 14, 15, 16, 17, 18, to direct the travel of such valve plates. These plates in practice may be of cast iron.

Ports 6 have housing of the valve members 7, 25, completed by plate 36, anchored by bolts 37, while bolt 38 through this plate 36 positively positions the valve unit in the port 6.

What is claimed and it is desired to secure by Letters Patent is:

1. A first valve member embodying a pair of concentric seats disposed in a common radial plane, said seats having an endless circular opening therebetween with opposing side walls extending parallel to the opening axis and the common axis of said seats, a second valve member, and a ring closure plate for the opening movable toward the seats and housed by the second valve member, said plate having a pair of endless seats, and having a tongue from one side and outward from the plane of the plate to protrude between said seats of the first valve member for guiding the plate toward and from the seats.

2. A valve plate of ring form T-shaped in cross-section throughout its entire ring extent, a valve body having a pair of radially spaced concentric seats adjacently terminating in opposing guide faces extending parallel to the ring and seat common axis for directing plate travel toward and from said seats by coacting solely with the cross-portion terminals of the T, a second valve member providing a housing for the plate as unseated, and actuating means for the plate carried by the second member for normally urging the plate out of the second member into seating position.

3. A valve cap, an opposing valve body having sockets, said cap having concentric openings, ring plates having stiffening means extending into said openings away from said sockets, said body having opposing endless concentric cylindrical walls parallel to and having a common axis with said ring plates, said stiffening means being clear of said openings and in the form of a medial tongue for each plate continuous throughout the annular extent of the plate, plungers in said sockets, and springs thrusting said plungers from said sockets for normally urging the plates to seat against said openings with the inner and outer radial portions of said plates riding along said parallel walls as guides in the travel of the plates to valve closing position.

In witness whereof I affix my signature.

DENT SANDFORD.